June 11, 1946.　　　W. H. TAYLOR ET AL　　　2,401,987
BONDING METAL TO PLYWOOD
Filed Oct. 30, 1943
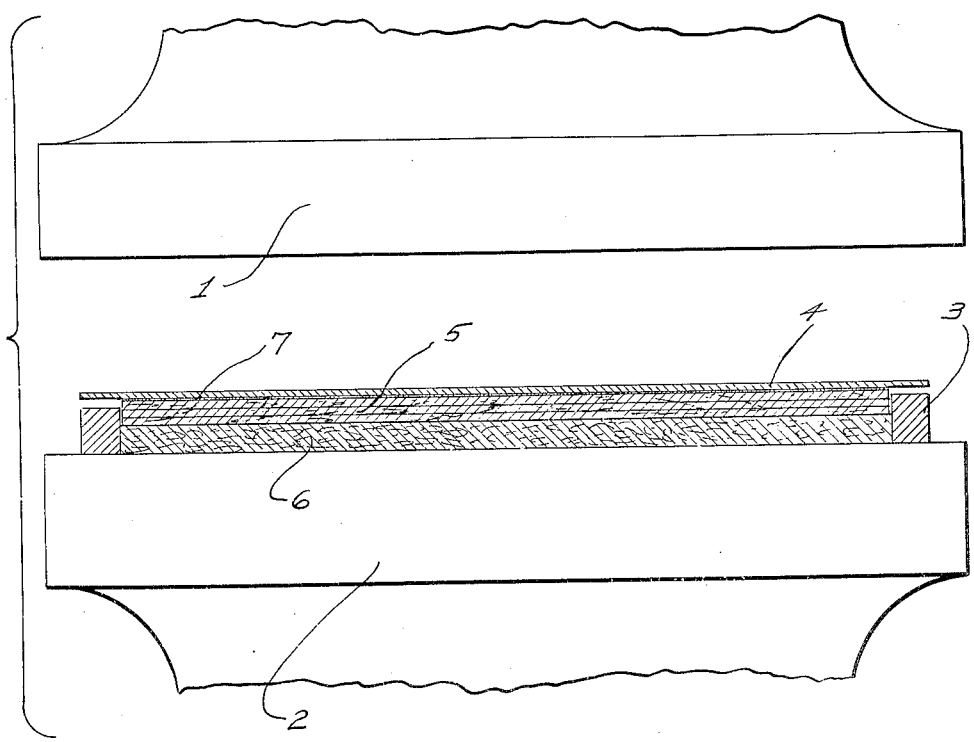
Inventor
William H. Taylor and
Robert Lee Jones II
Attorney Patented June 11, 1946

2,401,987

UNITED STATES PATENT OFFICE 2,401,987

BONDING METAL TO PLYWOOD

William H. Taylor and Robert L. Jones, II, Akron, Ohio, assignors to Wingfoot Corporation, Akron, Ohio, a corporation of Delaware Application October 30, 1943, Serial No. 508,442

5 Claims. (Cl. 154—129)

This invention relates to a method of hot bonding metal to a material having a low coefficient of thermal expansion, such as wood, plywood, and other fibrous compositions, etc. In the past it has been impossible to use a heat-curable adhesive for bonding together materials having such different coefficients of thermal expansion because of the greater expansion of the metal when it is heated to cure the adhesive.

According to this invention, the hot bonding is effected in a press in which the edges of the metal sheet are clamped to a platen of the press in such a way as to prevent its expansion when heated. The thermal expansion forces are temporarily taken up in the elastic deformation of the metal sheet while at the same time substantially all thermal expansion of the wood or other fibrous material is prevented. By hot bonding under these conditions, the finished product is free from the strains or stresses usually set up in such a product because of the difference in thermal expansion of the two materials.

The hot bonding of this invention is done in a platen press, the top platen being heated to the cement-curing temperature. The bottom platen is maintained cooler. The metal-wood assembly is built up so that the metal sheet is on top, and its edges extend beyond the edges of the wood. They may extend a half inch or more beyond the wood on all sides. A frame is provided to engage this free edge of the metal sheet and force it against the top platen of the press with considerable force so that the friction between the edge of the metal sheet and the platen is sufficient to restrain the forces of thermal expansion in the metal sheet. For example, to restrain a sheet of Alclad .020 inch thick, about 2000 pounds per inch of free edge is required. The shape of the frame is such that it conforms fairly closely to the shape of the wood or plywood, etc., which is placed within it so that there is substantially no metal sheet which is unsupported. Any large area of unsupported metal might permit buckling, and the desired effect would then be lost.

A pressure pad is placed under the wood or plywood, etc., to exert the right pressure to effect the bond and, further, keep the sheet material in contact with the press platen throughout its area. The pad may be rubber, chip board, balsa wood, etc., or fluid pressure may be used in a rubber or thin sheet metal bag.

The process is designed for use with any suitable, heat-curable adhesive. A satisfactory adhesive may be formed by first preparing a composition according to the formula for Composition A, which is given below, and then using this to prepare a final adhesive, as follows:

Composition A

| | |
|---|---|
| Neoprene GN | 100.0 |
| Latac | 0.6 |
| Zinc oxide | 10.0 |
| Gas black | 50.0 |
| Light calcined magnesia | 10.0 |
| Agerite powder | 2.0 |
| Stearic acid | 0.5 |

The figures refer to parts by weight. Neoprene is polymerized 2-chlorobutadiene-1,3, Latac is hexamethylene ammonium hexamethylene dithiocarbamate, and Agerite powder is phenyl beta naphthylamine. Composition A is then dissolved with a resin to form the final adhesive cement according to the following formula, the figures representing parts by weight:

| | |
|---|---|
| Methylethyl ketone | 56 |
| Monochloro benzene | 24 |
| Bakelite resin XR10312 | 7 |
| Composition A | 20 |

Of course, in preparing the cement, the order in which the ingredients are added to the solvent may be varied, the Bakelite resin or other heat-polymerizable resin, such as urea formaldehyde or melamine formaldehyde, being added to the composition before forming the cement, if desired.

The accompanying drawing illustrates a preferred means for carrying out the process. In the drawing the upper hot platen and lower cool platen of a press are indicated by the reference numerals 1 and 2. On the cool platen is the frame 3, which grips the edge of the metal sheet 4 when the press is closed. Within the frame is the sheet of plywood 5 and a resilient cushion 6. The frame surrounds the cushion and fibrous material.

In carrying out the process, the metal sheet 4 and the plywood 5 are first coated with a layer of adhesive 7. The adhesive may be applied as a cement or as a ribbon from which the solvent has been evaporated. The materials are assembled in the frame 3 on the cool lower platen 2 of the press. It is desirable to protect the materials on the lower platen from heat radiated from the top platen by a cardboard sheet or the like until it is time to close the press. When all the parts are ready, the heat protector is removed, and the press is quickly closed. The success of the process is dependent upon quick closing of the press so that the edge of the metal sheet is gripped before it has had time to heat up and expand.

The pressure will be applied during curing. An adhesive prepared according to the formula given above may be cured by heating to a temperature of about 325° F. for about 15 minutes, using an effective pressure of about 100 to 200 pounds per square inch. After curing, the top platen is preferably cooled somewhat before the press is opened to prevent transfer of the thermal stress in the metal sheet to the adhesive.

An alternative arrangement would employ elastic mechanism in the frame to exert the required gripping force and thus eliminate the necessity of using any resilient cushion under the wood.

What we claim is:

1. The method of hot bonding a metal sheet to a material having a low coefficient of thermal expansion which comprises pressing the edges of the metal sheet against the hot platen of a press with sufficient force to prevent slippage between the edges of the metal sheet and the surface of the hot platen while resiliently pressing the fibrous material against the metal sheet, there being a layer of curable adhesive between the fibrous material and the metal sheet, and supplying heat from the press through the metal sheet to cure the adhesive.

2. The method of hot bonding a metal sheet to a material which has a relatively low coefficient of thermal expansion which comprises providing a press with a hot upper platen and a cool lower platen, placing on the cool platen a frame of uniform height, placing a resilient cushion within the frame against the surface of the lower platen, and placing the material of relatively low thermal expansion on the cushion, the sum of the height of this material and the cushion being slightly greater than the height of the frame, next placing the metal sheet over this assembly with a layer of a curable adhesive between the metal sheet and said material and with the edges of the metal sheet extending beyond the edges of said material on all sides so as to extend over the top of the frame, and then applying pressure with the heated platen so as to heat and cure the adhesive while gripping the edges of the metal sheet on all sides between the frame and the heated platen to prevent the metal sheet from expanding as it is heated by the heated platen.

3. The method of hot bonding a metal sheet to a material which has a relatively low coefficient of thermal expansion which comprises providing a press with a hot upper platen and a cool lower platen, placing on the cool platen a frame of uniform height, placing a resilient cushion within the frame against the surface of the lower platen, and placing said material of relatively low thermal expansion on the cushion, the sum of the height of said material and the cushion being slightly greater than the height of the frame, next placing the metal sheet over this assembly with a layer of a curable adhesive between the metal sheet and said material and with the edges of the metal sheet extending beyond the edges of said material on all sides and over the top of the frame, protecting the assembly from heat radiated from the upper platen until pressure is applied, and then applying pressure with the heated platen to cure the adhesive and grip the edges of metal sheet between the platen and the top of the frame to prevent expansion of the metal sheet.

4. The method of hot bonding a metal sheet to a material which has a relatively low coefficient of thermal expansion which comprises providing a press with a hot upper platen and a cool lower platen, placing on the cool platen a frame of uniform height, placing a resilient cushion within the frame against the surface of the lower platen, and placing said material of relatively low thermal expansion on the cushion, the sum of the height of said material and the cushion being slightly greater than the height of the frame, next placing the metal sheet over this assembly with a layer of a curable adhesive between the metal sheet and said material and with the edges of the metal sheet extending beyond the edges of said material on all sides and over the top of the frame, protecting the assembly from heat radiated from the upper platen until pressure is applied, and then applying pressure with the heated upper platen to cure the adhesive and grip the edges of the metal sheet between the upper platen and the top of the frame to prevent any substantial expansion of it, and then cooling the upper platen after curing and before releasing the pressure.

5. The method of hot bonding a metal sheet to a material which has a relatively low coefficient of thermal expansion which comprises heating and pressing the sheet against the material in a press with a curable adhesive between the two, gripping the edges of the metal sheet to prevent the edges of the metal sheet from slipping on the surface of the press during heating, and preventing buckling of the metal sheet.

WILLIAM H. TAYLOR.
ROBERT L. JONES, II.